(12) United States Patent
McHale

(10) Patent No.: US 7,016,370 B2
(45) Date of Patent: Mar. 21, 2006

(54) CONTROLLER AND METHOD FOR CONTROLLING INTERFACING TO A DATA LINK

(75) Inventor: David Francis McHale, Harrow (GB)

(73) Assignee: ARM Limited, Cambridge (GB)

( * ) Notice: Subject to any disclaimer, the term of this patent is extended or adjusted under 35 U.S.C. 154(b) by 927 days.

(21) Appl. No.: 09/759,372

(22) Filed: Jan. 16, 2001

(65) Prior Publication Data

US 2001/0022787 A1   Sep. 20, 2001

(30) Foreign Application Priority Data

Feb. 24, 2000   (GB)   ..................... 0004416

(51) Int. Cl.
*H04B 7/212*   (2006.01)
*H04L 12/43*   (2006.01)
*H04L 12/66*   (2006.01)

(52) U.S. Cl. ................ 370/442; 370/458; 370/463
(58) Field of Classification Search ............... 370/371, 370/375–376, 419–420, 442, 458, 463; 700/94; 710/15, 22, 23, 36–45
See application file for complete search history.

(56) References Cited

U.S. PATENT DOCUMENTS

| | | | | |
|---|---|---|---|---|
| 2,323,000 A | * | 6/1943 | Auwarter et al. ............. 65/493 |
| 5,398,234 A | * | 3/1995 | O'Connell et al. .......... 370/249 |
| 5,574,944 A | * | 11/1996 | Stager ........................... 710/5 |
| 5,822,553 A | * | 10/1998 | Gifford et al. .............. 710/305 |
| 5,889,480 A | * | 3/1999 | Kim ............................. 341/50 |
| 5,928,342 A | * | 7/1999 | Rossum et al. ............... 710/74 |
| 5,960,211 A | * | 9/1999 | Schwartz et al. ............. 712/22 |
| 5,974,480 A | * | 10/1999 | Qureshi et al. ............... 710/27 |
| 6,044,225 A | * | 3/2000 | Spencer et al. ............... 710/52 |
| 6,049,841 A | * | 4/2000 | Fields et al. .................. 710/28 |
| 6,226,758 B1 | * | 5/2001 | Gaalaas et al. ............. 713/600 |
| 6,259,957 B1 | * | 7/2001 | Alexander et al. ............ 700/94 |
| 6,404,780 B1 | * | 6/2002 | Laturell et al. ............. 370/510 |
| 6,434,633 B1 | * | 8/2002 | Braun et al. .................. 710/15 |
| 6,529,975 B1 | * | 3/2003 | Miller et al. .................. 710/64 |
| 6,629,001 B1 | * | 9/2003 | Vadivelu ...................... 700/94 |

FOREIGN PATENT DOCUMENTS

GB         2 323 000 A     9/1998

* cited by examiner

*Primary Examiner*—Hassan Kizou
*Assistant Examiner*—Hong Sol Cho
(74) *Attorney, Agent, or Firm*—Nixon & Vanderhye P.C.

(57) ABSTRACT

The present invention provides a controller and method for controlling interfacing to a data link, the data link enabling data items relating to a number of data elements to be transferred in corresponding data slots of the data link. The controller comprises at least one channel, each channel comprising a data buffer for storing data items, and a control register associated with the data buffer and arranged to store control data. The control data is settable to define for which data element or data elements data items are to be stored in that data buffer. Further, an interface mechanism is provided for controlling the transfer of data items between the at least one channel and the data slots of the data link in dependence upon said control data. This enables a generic controller to be developed, which is of an acceptable size and cost.

16 Claims, 10 Drawing Sheets

| Bits | Name | Function |
|---|---|---|
| 15 | CM | Compact mode enable. If this bit is set to 1 and the RSIZE value is either 12 or 16 the two data words will be compacted into a 32-bit word for reading by the CPU. If set to 0 a 32-bit word will contain one slot data. |
| 14:13 | RSIZE | 00 – data is 16 bits<br>01 – data is 18 bits<br>10 – data is 20 bits<br>11 – data is 12 bits |
| 12 | RX12 | FIFO stores SLOT12 data (takes precedence over individual SLOT 12 register) |
| 11 | RX11 | FIFO stores SLOT11 data |
| 10 | RX10 | FIFO stores SLOT10 data |
| 9 | RX9 | FIFO stores SLOT9 data |
| 8 | RX8 | FIFO stores SLOT8 data |
| 7 | RX7 | FIFO stores SLOT7 data |
| 6 | RX6 | FIFO stores SLOT6 data |
| 5 | RX5 | FIFO stores SLOT5 data |
| 4 | RX4 | FIFO stores SLOT4 data |
| 3 | RX3 | FIFO stores SLOT3 data |
| 2 | RX2 | FIFO stores SLOT2 data (only use if sampling rate is 48KHz) |
| 1 | RX1 | FIFO stores SLOT1 data (only use if sampling rate is 48KHz) |

FIG. 6

| Bits | Name | Type | Function |
|---|---|---|---|
| 15 | CM | Read/write | Compact mode enable. If this bit is set to 1 and the TSIZE value is either 12 or 16 the two data words will be compacted into a 32-bit word for reading by the CPU. If set to 0 a 32-bit word will contain one slot data. |
| 14:13 | TSIZE | Read/write | 00 – data is 16 bits<br>01 – data is 18 bits<br>10 – data is 20 bits<br>11 – data is 12 bits |
| 12 | TX12 | Read/write | FIFO contains SLOT12 data (takes precedence over SLOT12RXTX) |
| 11 | TX11 | Read/write | FIFO contains SLOT11 data |
| 10 | TX10 | Read/write | FIFO contains SLOT10 data |
| 9 | TX9 | Read/write | FIFO contains SLOT9 data |
| 8 | TX8 | Read/write | FIFO contains SLOT8 data |
| 7 | TX7 | Read/write | FIFO contains SLOT7 data |
| 6 | TX6 | Read/write | FIFO contains SLOT6 data |
| 5 | TX5 | Read/write | FIFO contains SLOT5 data |
| 4 | TX4 | Read/write | FIFO contains SLOT4 data |
| 3 | TX3 | Read/write | FIFO contains SLOT3 data |
| 2 | TX2 | Read/write | FIFO contains SLOT2 data (only use if sampling rate is 48KHz) |
| 1 | TX1 | Read/write | FIFO contains SLOT1 data (only use if sampling rate is 48KHz) |

FIG. 7

CONTROLLER AND METHOD FOR CONTROLLING INTERFACING TO A DATA LINK

BACKGROUND OF THE INVENTION

1. Field of the Invention

The present invention relates to a controller and method for controlling interfacing to a data link.

2. Description of the Prior Art

To facilitate communication between products, it is known to develop standardised interfaces specifying the format of communications over a data link between those products. The standardised interface may be designed to facilitate the handling of multiple data streams over the data link, with each data stream relating to a particular data element. Often, the data link is partitioned, for example in time or frequency, to define a number of data slots, with particular data elements being assigned to particular data slots. By this approach, data relating to a plurality of different data elements can be transmitted over the data link at the same time.

For example, in the area of codecs (coder-decoders), Intel have developed an interface protocol for interfacing to codec chips. This interface protocol defines the format for a communications data link between a codec chip and any product, which is to communicate with that chip. More particularly, this interface protocol defines a digital data link employing a serial TDM (time division multiplexing) format for handling multiple input and output data streams. According to this protocol, the link architecture divides each audio frame into a number of data slots, with particular data elements (for example left channel audio, right channel audio, headset, modem, etc) being assigned to particular data slots.

Generally, for any particular application, a controller will be developed, which interfaces to the codec via the above described data link. Since, in any particular application, it is usual for only a subset of the data slots to be used, the controller will generally be developed having regard to the particular application. Whilst this helps to reduce the complexity of the controller, it often means that a different controller needs to be developed for each application.

However, this has generally been considered a more preferable approach than attempting to produce a generic controller, since such a generic controller would appear to require separate data buffering circuitry for each data slot supported by the data link specification, thereby increasing the size and cost of such a generic controller.

It is the aim of the present invention to provide a generic controller in which such size and cost problems are alleviated.

SUMMARY OF THE INVENTION

Viewed from a first aspect, the present invention provides a controller for controlling interfacing to a data link, the data link enabling data items relating to a number of data elements to be transferred in corresponding data slots of the data link, the controller comprising: at least one channel, each channel comprising a data buffer for storing data items, and a control register associated with the data buffer and arranged to store control data, the control data being settable to define for which data element or data elements data items are to be stored in that data buffer; and an interface mechanism for controlling the transfer of data items between the at least one channel and the data slots of the data link in dependence upon said control data.

The present invention provides a controller for interfacing to a data link, with the data link being of a type that enables data items relating to a number of data elements (for example left speaker, right speaker, modem, etc) to be transferred in corresponding data slots of the data link. It will be appreciated that the data slots may be defined in any appropriate way, for example by time division multiplexing (TDM), code division multiplexing (CDM), frequency division multiplexing (FDM), etc.

In accordance with the present invention, the controller is provided with at least one channel, with each channel comprising a data buffer, and a control register associated with that data buffer. Each data buffer may be arranged to store either data items to be output on the data link, or data items received from the data link, and the associated control register has control data settable to define for which data elements or data elements data items are to be stored in that data buffer. Hence, for example, one data buffer may be set up to store data items relating to left and right audio channels, whilst a separate data buffer may be set up to store data items relating to modem data. Alternatively, in another example, it may be appropriate to mix audio and modem data in a single data buffer.

The controller of the present invention further includes an interface mechanism for controlling the transfer of data items between the at least one channel and the data slots of the data link in dependence on the control data. It will be appreciated that the control data may take a variety of forms. For example since there is a correspondence between a particular data element, and a particular data slot of the data link, the control data may be specified either by reference to the data element, or by reference to the corresponding data slot. In either event, the control data is sufficient to enable the interface mechanism to determine into which data slots to insert data items retrieved from a particular data buffer, and/or to determine into which data buffer to place data items received in particular data slots of the data link.

With regard to the setting of the control data, it will be appreciated that the control registers may be provided such that the control data is settable only once when the controller is initially programmed for use, or alternatively, if desired, the control registers may be provided such that the control data is reprogrammable at any time so as to enable the use of a particular data buffer to be altered during the operation of the controller.

The present invention enables a generic controller to be developed without the requirement for separate data buffering circuitry for each data slot supported by the data link, and hence alleviates the cost and size issues that would typically hinder development of a generic controller.

In one embodiment of the present invention, the data buffer of at least one of the at least one channels is arranged to store prior to transmission on the data link data items relating to one or more data elements as specified by the control data, and the interface mechanism is arranged to be responsive to the control data to transmit on the data link in the corresponding one or more data slots data items retrieved from the data buffer.

In addition, or alternatively, the data buffer of at least one of the at least one channels may be arranged to store data items received from the data link and relating to one or more data elements as specified by the control data and the interface mechanism is arranged to be responsive to the control data to store in the data buffer data items received from the corresponding one or more data slots.

Whilst it is possible that the controller may be arranged just to transmit data items on to the data link, or just to receive data items from the data link, in preferred embodiments the controller is arranged to both transmit and receive data items. In such preferred embodiments, each channel preferably comprises a pair of said data buffers and their associated control registers, one of said data buffers being arranged to store data items to be transmitted on the data link, and the other of said data buffers being arranged to store data items received from the data link. Hence, in preferred embodiments, each channel is able to transmit and receive data items. It should be noted that, since each of the pair of data buffers in a particular channel has its own associated control register, there is no requirement in preferred embodiments for the transmit data buffer to handle the same type of data element(s) as the receive data buffer, and the control registers for the transmit data buffer and receive data buffer may be programmed entirely independently.

In preferred embodiments, the number of channels provided by the controller is less than the number of data elements whose data items are capable of being transferred by the data link. This is achievable due to the provision of control registers for each data buffer whose control data is settable to define for which data element or data elements data items are to be stored in that data buffer. It will be appreciated that this approach provides a great deal of flexibility as to how the controller may be used in any particular instance, whilst enabling the overall size of the controller to be kept to an acceptable size.

In preferred embodiments, each data buffer is arranged to store data items relating to one or more data elements having the same sampling rate. It has been found that by stipulating this requirement, the control mechanisms within the controller can be significantly simplified.

As mentioned, earlier, the present invention may be used to control interfacing to a variety of different data links which enable data items relating to a number of data elements to be transferred in corresponding data slots of the data link. However, in preferred embodiments, the controller is connectable to a codec via the data link. In a particular preferred embodiment, the codec is an audio codec, and the data link is an AC-link conforming to Intel's AC97 specification.

The data buffers may take a variety of forms. However, in preferred embodiments, each data buffer comprises a first-in-first-out (FIFO) buffer.

It will be appreciated that, typically, in addition to being connected to the data link, the controller will be connected to other data processing circuitry to which data items from the link can be forwarded, and from which data items to be transmitted over the data link can be received. In preferred embodiments, the controller further comprises a memory interface for coupling the controller to a memory, to enable data items to be transferred between the memory and the at least one channel. In one embodiment, the memory interface couples the controller to the memory via a processor arranged to control access to the memory. However, it will be appreciated by those skilled in the art that other techniques, for example Direct Memory Access (DMA) techniques, may be used to couple the memory interface of the controller to the memory.

In preferred embodiments, each control register has a first field settable to indicate a compact mode in which data words passed between the associated data buffer and the memory comprise a plurality of said data items. By this approach, the efficiency of the communication between the controller and the memory can be improved in situations where the size of the data words that can be passed between the controller and the memory is large enough to include a plurality of data items. For example, if 32-bit data words can be passed between the controller and the memory, and the actual size of the data items is 16-bits or less, then the compact mode can be specified in the first field to ensure that two data items are included in each data word transferred between the memory and the controller.

In preferred embodiments, data items are represented as a fixed size when transferred in the data slots, and each control register has a second field settable to indicate the actual size of data items stored in the associated data buffer, and if the first field is set the memory interface is arranged to reference the second field in order to determine how many data items are to be included in each data word passed between the associated data buffer and the memory. Hence, in preferred embodiments, a field within the control register is used to specify the actual size of the data items, and this information can be used in addition with the information set in the first field to determine the number of data items to be included in each data word.

However, it will be appreciated that the information about the actual size of the data items is useful information, irrespective of whether the controller supports such a compact mode or not. In particular, by including a field within the control register that is settable to indicate the actual size of each data item stored in the associated data buffer, this enables the memory interface to convert the data items between the actual size and the fixed size. Hence, in preferred embodiments, when a data item is received at the memory interface for adding to a data buffer, the memory interface can shift the data item by the required number of bits in order to generate a representation of the data item at the fixed size prior to placing that fixed size data item in the data buffer. Conversely, when a fixed size data item from the data buffer is to be transferred via the memory interface to the memory, the memory interface can use the actual size information to again shift the data item to produce the data item at its actual size.

In preferred embodiments, the control data within the control register specifies the number of data elements whose data items are stored in the associated data buffer, and the memory interface is arranged to control the rate of transfer of data between the data buffer and the memory dependent on the control data. Hence, if the control data indicates that data items for two data elements are stored in the data buffer, then in preferred embodiments data items will be stored into the data buffer, and read out of the data buffer, in pairs. This means that the memory interface should preferably ensure that there are always two data items in a transmit data buffer wherever possible to ensure that there will be sufficient data items to meet a request for the transmission of such data items over the data link. Further, the memory interface should preferably ensure that there is always space to receive two data items into the receive data buffer.

Viewed from a second aspect, the present invention provides a method of controlling interfacing to a data link, the data link enabling data items relating to a number of data elements to be transferred in corresponding data slots of the data link, the method comprising the steps of: (a) providing at least one channel, each channel comprising a data buffer for storing data items, and a control register associated with the data buffer; (b) storing control data in the control register to define for which data element or data elements data items are to be stored in the associated data buffer; and (c)

controlling the transfer of data items between the at least one channel and the data slots of the data link in dependence upon said control data.

BRIEF DESCRIPTION OF THE DRAWINGS

The present invention will be described further, by way of example only, with reference to a preferred embodiment thereof as illustrated in the accompanying drawings, in which:

FIG. 6 is a table illustrating the control data within a control register associated with a receive data buffer in accordance with preferred embodiments of the present invention;

FIG. 7 is a table illustrating the control data within a control register associated with a transmit data buffer in accordance with preferred embodiments of the present invention;

DESCRIPTION OF A PREFERRED EMBODIMENT

As mentioned earlier, the present invention may be used to develop a controller for controlling interfacing to a variety of different data links which enable data items relating to a number of data elements to be transferred in corresponding data slots of the data link. However, for the purposes of illustrating a preferred embodiment of the present invention, it will be assumed that the controller is connectable to an audio codec via a data link, and in particular a data link conforming to Intel's AC97 specification. In accordance with this specification, the data link is often referred to as an AC-link.

Figure 1:
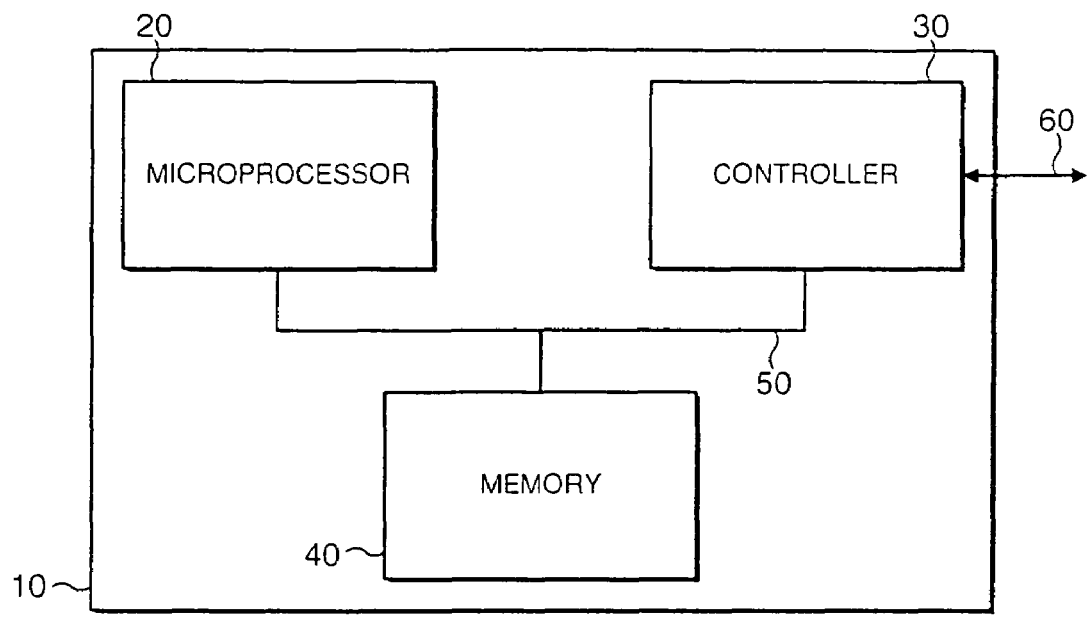
FIG. 1 is a block diagram of a chip in which a controller in accordance with preferred embodiments of the present invention may be employed.

FIG. 1 is a block diagram schematically illustrating the relationship between elements of a chip 10 arranged to communicate with an audio codec via an AC-link 60. The chip 10 incorporates a microprocessor 20 for performing data processing operations on data retrieved from the memory 40 over bus 50. It will be appreciated by those skilled in the art that FIG. 1 provides a very simplified view of the chip 10, and that typically further elements may be connected between the microprocessor 20 and the memory 40. For example, the microprocessor 20 may have access to a cache for storing instructions and/or data being used by the microprocessor, and that in such instances the microprocessor 20 may be decoupled from the memory 40 by a write buffer or the like. Indeed, the memory 40 may be provided externally to the chip 10.

However, for the purposes of describing the preferred embodiment of the present invention, the exact manner in which the microprocessor 20 communicates with the memory 40 is not relevant, and for simplicity the memory 40 has been illustrated as being connected directly to the microprocessor via the bus 50.

In accordance with preferred embodiments of the present invention, a controller 30 is also connected to the bus 50 to control the transfer of data items between the chip 10 and an audio codec connected to the chip 10 via the AC-link 60. In particular, when the chip 10 is to send data items to the audio codec, the microprocessor 20 is arranged to retrieve those data items from the memory 40, and to pass them over the bus 50 to the controller 30 for outputting in appropriate data slots of the AC-link 60. Similarly, when data items are received by the controller 30 over the AC-link 60 from the audio codec, those data items are buffered within the controller 30, and subsequently can be retrieved by the microprocessor 20 for storage in the memory 40.

It will be appreciated that, in certain embodiments, Direct Memory Access (DMA) techniques may be used to enable a more direct communication between the controller 30 and the memory 40 without employing the microprocessor 20. DMA techniques are well known in the art, and hence will not be described further herein.

Figure 2:
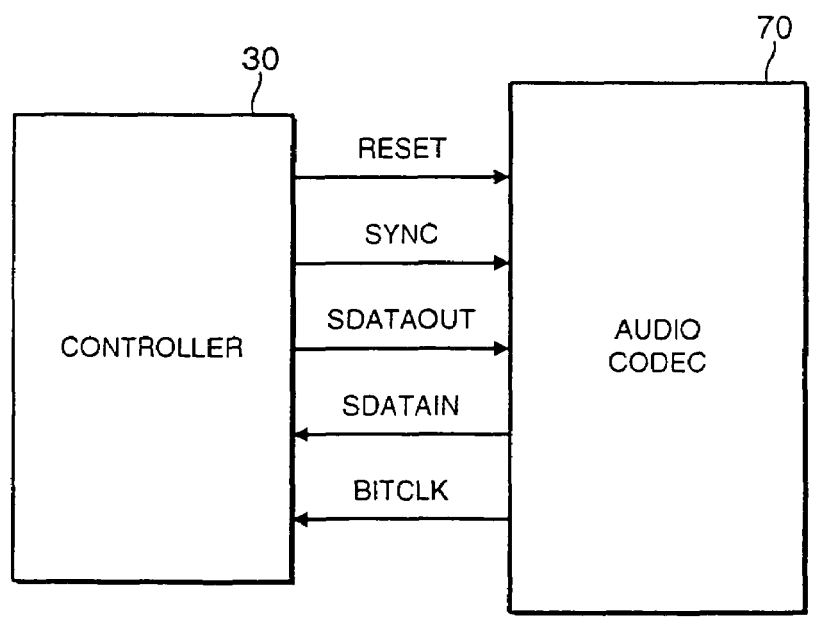
FIG. 2 is a diagram illustrating the interface between the controller and an audio codec in accordance with preferred embodiments of the present invention.

FIG. 2 illustrates in more detail the AC-link between the controller 30 and an audio codec 70. The AC-link consists of a five pin interface that is a bi-directional, fixed rate, serial PCM (Pulse Code Modulation) stream, and handles multiple input and output audio streams, as well as control register accesses employing a time division multiplexed (TDM) scheme. The five pins connecting the controller 30 to the codec 70 are as follows:

BITCLK—This is a clock signal fixed at 12.288 MHz.

RESET—This is a signal used to initiate an asynchronous cold reset of the external codec, and is active low. By applying a cold reset, all information in the codec registers will be lost.

SDATAIN—This input receives the status information and digital audio input streams. It is sampled on the falling edge of BITCLK, and is output from the codec on the rising edge.

SDATAOUT—This output transmits the control information and the digital audio output streams. It is output on the rising edge of BITCLK.

SYNC—This signal is fixed at 48 kHz, derived by dividing down the serial clock (BITCLK). The SYNC signal is set from the rising edge of BITCLK. The SYNC signal can also be output asynchronously when the audio codec is in a power down state to reactivate the audio codec (without losing any information in the codec registers).

The AC-link architecture divides each data frame into twelve outgoing and twelve incoming data streams transmitted via the SDATAOUT and SDATAIN pins, respectively, these data streams, or data slots as they shall be referred to hereafter, each having 20-bit sample resolution.

Figure 3:
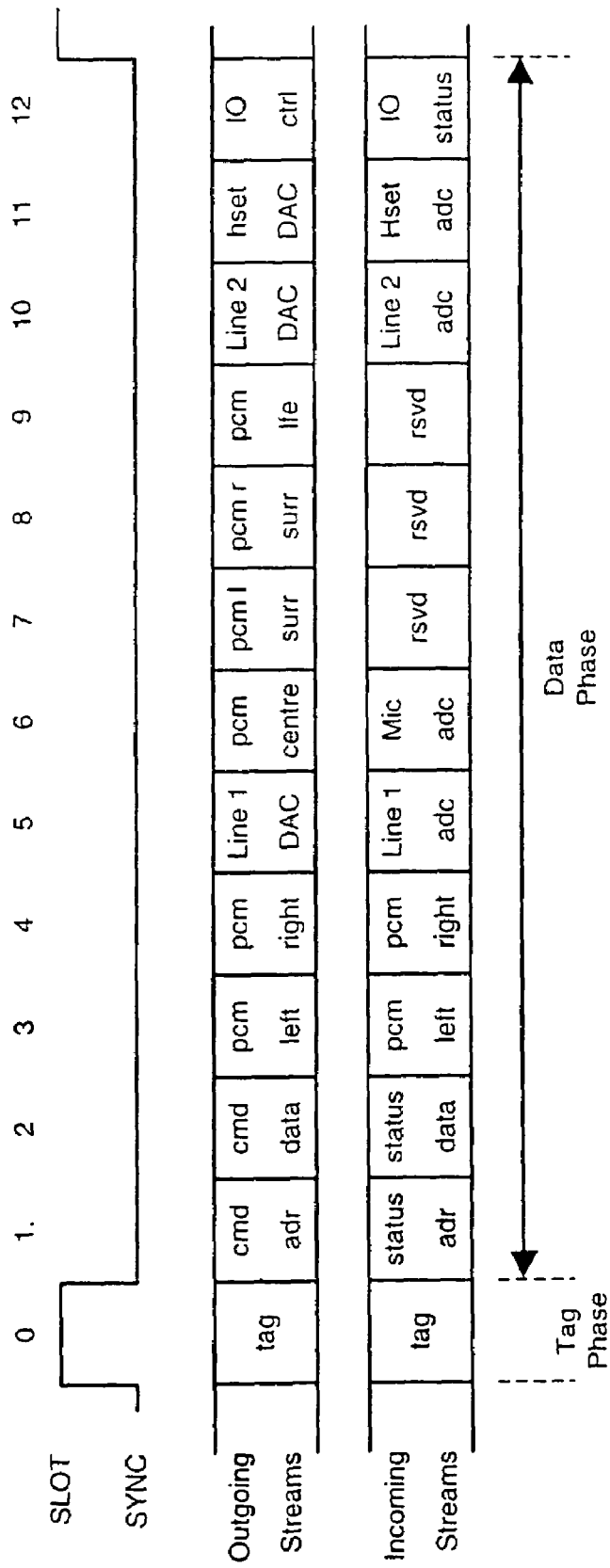
FIG. 3 is a diagram illustrating the content of an audio frame for both outgoing and incoming data streams.

FIG. 3 is a diagram illustrating in more detail the format of a bi-directional frame. As can be seen, the frame is made up of a tag and a data phase. Each phase has a number of data slots. Slot zero is the tag phase, whilst slots one to twelve are the data phase. The twelve data slots provided in the data phase are each allocated to particular data elements, such that each data slot only carries data items relating to the data element associated with that data slot.

Dealing first with the outgoing data stream output on the SDATAOUT pin, the data output frame from the controller contains control and PCM data targeted for the external codec. As can be seen from FIG. 3, the information transmitted on SDATAOUT is made up of a number of different slots, with each slot being made up of a number of bits, and each new bit position being presented to the AC-link on a rising edge of BITCLK. The following provides a brief description of each of slots 0 to 12 transmitted on SDATAOUT:

SDATAOUT Slot 0: Tag Phase (16 bit)

The first bit of slot 0 is designated the "Valid Frame" bit. If this first bit is 1, it indicates that the current data frame contains at least one slot of valid data and the external codec is to sample the following bits in this Slot 0 to determine which frames do in fact have valid data. The next 12-bit positions indicate which of the corresponding 12 time slots contain valid data. Valid slots are signified by a 1 in their respective bit position. Bits 2–0 should always be 0. The controller will generate the slot 0, determined by the validity of the data in the relevant data buffers of the controller, the values in the transmit control registers and the value of Disable Request bits from the SDATAIN slot 1. If a slot is not valid the controller will stuff zeros into the relevant SDATAOUT slots.

SDATAOUT Slot 1: Register Address (20 bit)

Slot 1 is used to indicate the register address of the current frame's register access. The MSB of Slot 1 (bit 19) signifies whether the current control operation is a read (0) or a write (1). Bits 18–12 are used to specify the register address of the read or write operation. The trailing 12 bits are reserved and should be zero.

SDATAOUT Slot 2: Register Write Data (20 bit)

Slot 2 contains the register data of the current frame's (as defined in slot 1) register write access. Bits 19–4 contain the 16-bit value to be written to the register. The hardware will zero bits 3–0. If the access is a register read, the entire slot will be stuffed with zeros (this requirement will be determined by the controller which will use bit 19 in slot 1 to determine if the operation is a read or write).

SDATAOUT Slot 3: PCM Playback left Channel (20 bit)

Slot 3 is used to transmit PCM playback data intended for the left channel DAC on the codec.

SDATAOUT Slot 4: PCM Playback right Channel (20 bit)

Slot 4 is used to transmit PCM playback data intended for the right channel DAC on the codec.

SDATAOUT Slot 5: Modem 1 channel (20 bit)

Slot 5 is used to transmit modem line 1 DAC input data.

SDATAOUT Slot 6: PCM Playback Centre Channel (20 bit)

Slot 6 is used to transmit PCM playback data intended for the Centre channel on the codec.

SDATAOUT Slot 7: PCM Playback left surround Channel (20 bit)

Slot 7 is used to transmit PCM playback data intended for the left surround channel on the codec SDATAOUT Slot 8: PCM Playback right surround Channel (20 bit)

Slot 8 is used to transmit PCM playback data intended for the right surround channel on the codec SDATAOUT Slot 9: PCM Playback low frequency effects surround Channel (20 bit)

Slot 9 is used to transmit PCM playback data intended for the LFE (Low Frequency Effects) channel on the codec SDATAOUT Slot 10: Modem 2 channel (20 bit)

Slot 10 can be used to either transmit modem line 2 DAC input data or PCM Left channel data when 96 kHz sampling rate is required (e.g. DVD players).

SDATAOUT Slot 11: Head Set channel (20 bit)

Slot 11 can be used to either transmit head set input data or PCM Right channel data when 96 kHz sampling rate is required (e.g. DVD players).

SDATAOUT Slot 12: IO control channel (20 bit)

Slot 12 can be used to either transmit IO control input data or PCM Centre channel data when 96 kHz sampling rate is required (e.g. DVD players).

Turning now to the incoming data stream, the audio input frame input to the controller on the SDATAIN pin contains the status and PCM data from the external codec control registers and stereo ADC (Analog to Digital Converter). The Tag slot, slot zero, contains 16 bits that tell the controller whether the external codec is ready, and the validity of data from certain device subsections.

As is evident from FIG. 3, the incoming data stream transmitted on SDATAIN is also made up of a number of different data slots, each data slot being made up of a number of bits, and each new bit position being presented to the AC-link on a rising edge of BITCLK. Details of slots 0 to 12 transmitted on SDATAIN are as follows:

SDATAIN Slot 0: Codec Status bits (16 bits)

The first bit of SDATAIN Slot 0 (bit 15) indicates when the codec is ready. The controller checks the following data bits in slot 0 to see which other subsections are ready. E.g. a 1 in bit 14 would indicate slot 1's data was valid and a 1 in bit 13 would indicate slot 2's data was valid etc. The data obtained from this slot will be stored in the controller in order to allow bits from this to validate the slots within the frame.

SDATAIN Slot 1: Status Address

Slot 1 is used to echo the external codecs register address back to the controller when the codec has been issued a read request from the previous frame. The external codec will only echo the register index for a read access. (Write accesses will not return valid data in Slot 1).

For reads, bit 19 will always be stuffed with 0. Bits 18–12 contains the 7-bit register index for the codec registers. Bits 11–2 are used for Sample Rate Conversion (SRC) functionality, known as Disable Request bits for slots 3–12. When the external codec sets these bits to 1 the corresponding slot should NOT send data on SDATAOUT in the following frame. When the external codec sets these bits to 0 (for active output data slots as set in the transmit control registers of the controller) the corresponding slot should respond with data on SDATAOUT in the next frame. The Disable Request bits will have no effect for a particular data slot if the controller has not been set up to store data items for that data slot, and in such cases zeros will be transmitted in that data slot in the next frame.

If the relevant data buffer (set up to store data items for the requested data slot) within the controller has no data available for transmission, an underflow occurs and invalid data, all zeros, will be transmitted from that data buffer until the data buffer becomes non-empty or until transmit is disabled. The microprocessor 20 is arranged to respond to a transmit interrupt request to write transmit data at a sufficient rate to prevent an underflow error condition.

With reference to the earlier description of SDATAIN Slot 0, it should be noted that the relevant bit in slot 0 concerning the validity of slot 1 only relates to the validity of the resister address (i.e. the validity of the data in bits 18–12), and the Disable Request bits will accordingly be reviewed by the controller irrespective of the value of the slot 1 validity bit in slot 0.

SDATAIN Slot 2: Status Data

Slot 2 returns the control register data requested by the controller from the previous read request. If slot 2 is "tagged" invalid by the Codec Status Bits in slot 0 then the entire slot will be stuffed with 0s by the codec. Bits 19–4 contains the 16-bit codec register value returned to the controller. Bits 3–0 are returned zeroed.

SDATAIN Slot 3: Left Channel PCM Capture Data

Slot 3 contains the left channel ADC data. The signal digitised is selected via register 1 Ah by default 0000h selecting the MIC input. This is a 20-bit slot, where the 1PCM data returned is MSB first and the last remaining bits will be 0.

SDATAIN Slot 4: PCM Record Right Channel

Slot 4 contains the right channel ADC data. The signal digitised is selected via register 1 Ah by default 0000h selecting the MIC input. This is a 20-bit slot, where the 18-bit PCM data returned is MSB first and the last two remaining bits will be 0.

SDATAIN Slot 5: Modem 1 ADC

Slot 5 contains the Modem Line 1 ADC output data.

SDATAIN Slot 6: Microphone record data

Slot 6 contains the microphone record data.

SDATAIN Slot 7–9: Reserved (1 slot Touch Screen?)

Currently these slots are reserved, however if data is required from the slot the receive FIFOs can be configured to accept the data sent.

SDATAIN Slot 10: Modem 2 ADC

Slot 10 contains the Modem Line 2 ADC output data.

SDATAIN Slot 11: Headset ADC

Slot 11 contains Headset ADC output data.

SDATAIN Slot 12:

Slot 12 contains IO status data.

The incoming data on SDATAIN is sampled by the controller on the falling edge of BITCLK.

Prior to any attempts at putting the external codec into operation, the controller should poll the first bit in the audio frame input (SDATAIN slot 0, bit 15) for an indication that the codec has gone "Codec Ready".

The first bit received in Slot 0 is a global bit, which flags whether the codec is in the "Codec Ready" state, or not. If the "Codec Ready" is a 0, this indicates that the codec is not ready for normal operation. If the "Codec Ready" is a 1, control and status registers are in a fully operational state. The user must then probe additional Control/Status registers to determine which subsections, if any are ready.

As can be seen from FIG. 3, each data slot can potentially be sampled once every SYNC signal, and as mentioned earlier, the SYNC signal is fixed at 48 kHz in preferred embodiments. However, as is apparent from the earlier description of SDATAIN slot 1, the codec is able to issue Disable Request bits for slots 3 to 12, thereby enabling those ten slots to have varying sample rates. In accordance with preferred embodiments of the present invention, the controller is provided with a novel structure that allows these varying sample rate slots and fixed sample rate slots to be supported without having to provide separate data buffers for each slot. The structure of the controller of preferred embodiments is illustrated in FIG. 4.

Figure 4:
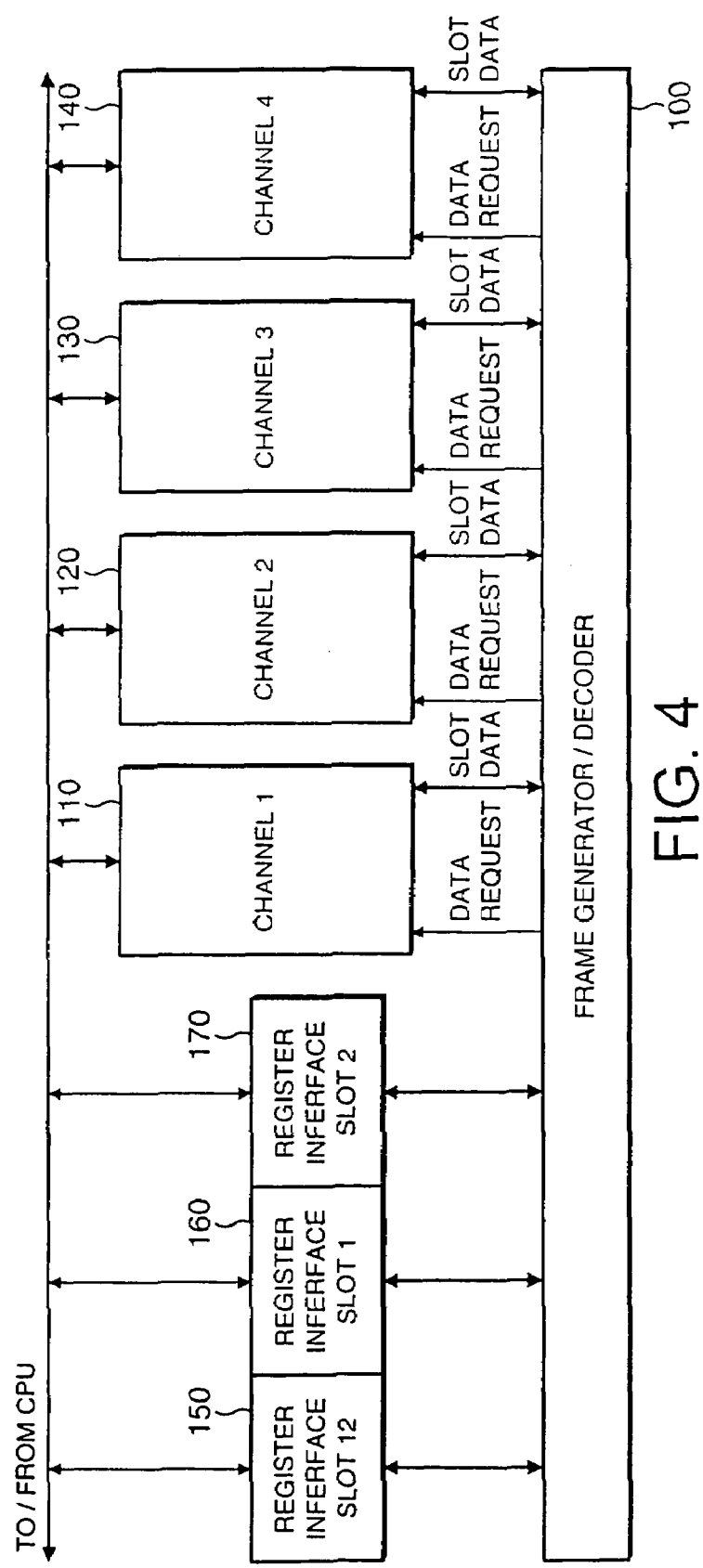
FIG. 4 is a block diagram illustrating in more detail the elements of the controller in accordance with preferred embodiments of the present invention.

As shown in FIG. 4, the controller is provided with four channels 110, 120, 130 and 140, and in preferred embodiments each channel incorporates a transmit data buffer for data items to be output on to the AC-link, a receive data buffer for data items received from the AC-link, and separate control registers for the transmit data buffer and the receive data buffer. In preferred embodiments, the data buffers are implemented as FIFOs. It has been found that the minimum number of channels required to support all of the AC-link slots is four, which allows independence between modem, audio, headset and microphone channels.

To allow the controller to support all slots per frame, the controller of preferred embodiments is based on the assumption that the sampling rate for certain groups of data elements will be the same. Hence, it is assumed that all audio data will be at the same sampling rate, and all modem data will be at the same sampling rate. For example, if the external codec supported channels PCMLEFT, PCMRIGHT, MODEM1, PCMCENTRE, PCMLSURROUND, PCMRSURROUND, PCMLFE, MODEM2 and HSET, the control registers within the channels might be programmed so that for the transmit data buffers, all of the audio data is routed through channel one, the modem data is routed through channel two, and the HSET data is routed through channel three. The controller can also be arranged to receive MIC data at a different rate, which could be arranged to be received through channel four. Alternatively, since a separate control register is provided in each channel for the receive data buffer, the MIC data could be arranged to be received through any other channel that is deemed appropriate.

The provision of control registers associated with each FIFO provides a great deal of flexibility as to how data items relating to particular data elements are handled by the controller. In particular, the control data within the control register is settable to define for which data element(s) data items are to be stored in the corresponding data buffer, and accordingly any data buffer can be used to store any data items destined for, or received from, any data slot in a frame. However, in preferred embodiments, this freedom is restricted to ensure that data items stored in any particular data buffer only relate to data elements with the same sampling rate, thereby enabling the use of a FIFO buffer, and reducing the complexity of the control mechanisms within the controller.

Figure 5:
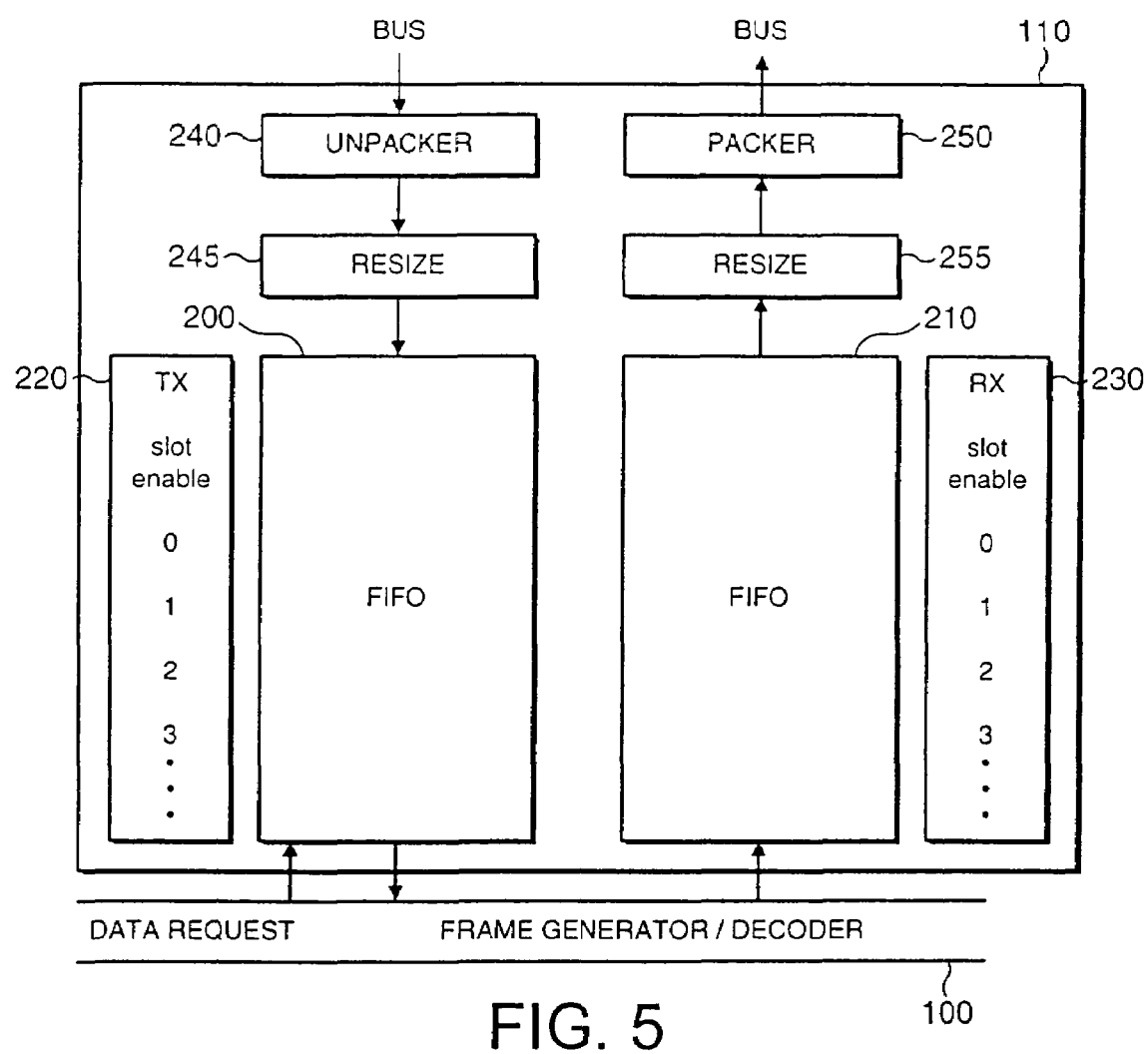
FIG. 5 is a block diagram illustrating in more detail a channel provided within the controller in accordance with preferred embodiments of the present invention.

FIG. 5 illustrates in more detail the elements within channel 110 illustrated in FIG. 4. Each of the four channels will in preferred embodiments have the same structure. The receive part of channel 110 is controlled via a receive control register 230. This register includes control data identifying for which data element(s) data items are to be stored in the associated FIFO buffer 210, and hence from which data slot(s) in an audio frame data items are going to be stored into the FIFO buffer 210. As mentioned previously, the control data in the receive control register 230 must be set to ensure that all data items stored in the FIFO 210 are at the same sampling rate.

In addition to defining for which data element(s) data items are to be stored in the FIFO buffer 210, the control register 230 also identifies the number of bits of the data item that are actually required. As mentioned earlier, data items are represented at a fixed size, in preferred embodiments 20 bits, when transferred in the data slots, but the actual size of the data items may be less than 20 bits. In preferred embodiments, the receive control register 230 also includes a field which enables a compact mode to be enabled, which affects the way in which the data items are transferred between the microprocessor and the controller. This compact mode will be discussed in more detail later.

FIG. 6 is a table illustrating the relevance of the various control data bits within the receive control register 230 in accordance with preferred embodiments of the present invention. If desired, the control register can be arranged to store additional bits, for example to indicate whether the FIFO is enabled or not, or to provide a time out count value, such that the associated FIFO would have the capability of generating a time out interrupt, for example when the FIFO is non-empty and no further data is received for a period of time.

Turning now to the transmit part of the channel 110, this is controlled via a transmit control register 220. This register has control data used to specify which data slot(s) in the audio frame the data items in the associated FIFO 200 are to be transmitted in, i.e. for which data element(s) data items are stored in the FIFO 200. As with the receive part of the channel, the control data must in preferred embodiments be set to ensure that all of the data items in the FIFO 200 are intended for data slots with the same sampling rate. Further, in preferred embodiments, the data items must be supplied lowest slot number first to enable them to be passed out to the frame generator/decoder 100 in the appropriate order. The data in the control register also identifies the number of bits that need to be appended to the data passed from the microprocessor 20 to the controller 30 to make the data items 20 bits in length. As with the receive control register, in preferred embodiments a field is also provided to enable a compact mode of operation to be enabled. FIG. 7 is a table illustrating the significance of the various control data bits within the transmit control register 220.

In preferred embodiments, the control register 220 is also used to identify the number of data words that must be in the FIFO 200 before those data items can be transmitted. If the FIFO 200 does not have enough data items, and the codec 70 has requested data items for the data slots serviced by the channel, then in preferred embodiments an underflow interrupt will be generated. It will be appreciated that the number of data items in the FIFO must be equal to or greater than the number of data elements whose data items can be stored in the FIFO, as indicated by the TX bits in the transmit control register 220.

The transmit part of the channels also support variable sample rates via the Data Request disable bits transmitted from the external codec in slot 1 of the incoming data stream. These bits will be decoded by the frame generator/decoder 100, and passed to the appropriate channels 110, 120, 130, 140 as indicated in FIG. 4 to indicate whether or not data items should be output from those channels in the next outgoing audio frame.

In preferred embodiments, valid word bits within the transmit FIFO 200 are also used to determine if a corresponding data item in the FIFO is valid and can be sent in the next available frame. Slot 0 for transmission is determined by the controller depending upon the values in the transmit control register 220, the Data Request disable bits, and the FIFO having valid data to send. If a slot does not have any data for transmission in a particular frame, the controller will fill the corresponding data slot with zeros. As mentioned earlier, if the Data Request disable bits indicate that data should be output in the next frame, but data items in the corresponding FIFO are not available, an underflow interrupt will be generated by the controller. It is assumed that the codec will set all the Data Request disable bits for a given sample rate at the same time, e.g. all the Data Request disable bits for audio data will be set at the same time. As mentioned earlier, in preferred embodiments, data items with the same sample rate are preferably stored in the same transmit FIFO 200, and preferably data items should be made available within the FIFO for transmission when requested.

If the external codec does not support the Data Request disable bits, those bits will always be set to zero, thereby signifying a standard sampling rate of 48 kHz. However, as mentioned earlier, the Data Request disable bits will have no effect for any data slots for which the controller has not been set up to transmit data items, irrespective of whether or not the external codec supports the Data Request disable bits. Instead for any such data slots, the controller will be arranged to output zeros in the next frame.

As slots 1 and 2 are always transmitted at 48 kHz in preferred embodiments, the external codec does not supply Data Request disable bits for those slots. In accordance with preferred embodiments of the present invention, as illustrated in FIG. 4, separate registers 150, 160 and 170 are provided for storing data items for slot 12, 1 and 2, respectively. Accordingly, data for transmission on slots 1, 2 and 12 can be obtained from either one of the four channels 110, 120, 130, 140 if those channels have been set to store data items associated with such data slots, or directly from the registers 150, 160 and 170. In preferred embodiments, it should be ensured that the control data is set such that data items for a particular slot can only come from one source, and hence if the registers 150, 160 or 170 are being used for data items for slots 12, 1 or 2, then the relevant control bits of the control registers in channels 110 to 140 should not be set to prevent those channels handling data items for those slots. However, if data for those data slots is present in the registers 150, 160 or 170, and one of the channels 110 to 140, a default for the controller can be set, for example to send the data items in the relevant channel first.

When receiving data items for slots 1, 2 and 12, in preferred embodiments the data items will be stored in the appropriate channel if the relevant control bits have been set in the associated control register, rather than storing those data items in the registers 150, 160. However, if the relevant control bits have not been set in the channels, then the data items will always go to the registers 150, 160.

In preferred embodiments, it is envisaged that the channels would only be used to transmit slot 1 and 2 data when the external codec is being set up for operation. Once the set up of the external codec is complete, it is preferred that the data items for slots 1 and 2 should come via registers 160, 170, thereby freeing up an available channel.

Returning now to FIG. 5, the purpose of the unpacker 240, resizer 245, resizer 255 and packer 250 will now be discussed in more detail. Considering first the transmit unpacker 240, as mentioned earlier the transmit control register 220 has a compact mode (CM) bit, which is set to determine if the data from the microprocessor 20 is in 32-bit or 16-bit words. The transmit control register also contains TSIZE bits indicating the actual size of the data items to be transmitted. If the TSIZE bits are set to indicate the data items are 12 or 16 bits in length, and the CM bit is set (in preferred embodiments to a logic 1 value), a 32-bit word passed from the microprocessor to the controller will consist of two data items, the unpacker 240 then being used to split the 32-bit word into its two 16-bit constituents. It should be noted that this compact mode will only operate if the TSIZE bits are set to either 12 or 16 bits, and not if they are set to 18 or 20 bits. Additionally, if the CM bit is not set (i.e. in preferred embodiments is at a logic 0 value), then a 32-bit word passed from the microprocessor to the controller will only contain one data item even if TSIZE is set to 12 or 16 bits. In preferred embodiments, it should be noted that if the CM bit is set, it must be ensured that the FIFO buffers are set up to accept even numbers of data items e.g. data items for slots 3 and 4, not data items for slots 3, 4 and 5.

Once the unpacker 240 has performed any unpacking necessary, the transmit resizer 245 is used to resize each data item into a 20 bit representation. As mentioned earlier, the TSIZE bits in the transmit control register indicate the actual size of the data items received from the microprocessor. Hence, once the data has been unpacked as required, the resizer 245 is then arranged to left shift the data item by the desired amount to make a 20 bit word to store into the FIFO 200. The least significant bits are in preferred embodiments stuffed with zeros. If TSIZE is set to 20, it will be appreciated that no left shifting or zero stuffing is required. It should also be noted that the data items will be stored in the FIFO lowest slot number first in preferred embodiments to enable those data items to subsequently be provided to the frame generator/decoder 100 in the appropriate order. For example, if the FIFO 200 is set up to store data items pertaining to data slots 3 and 4, then the data item for slot 3 will be the first data item into the FIFO, and the data item for slot 4 will be the second data item into the FIFO. If TSIZE is set to either 12 or 16 bits, and the compact mode is set, then bits 15:0 in the data words received from the microprocessor should contain the data item for slot 3, and bits 31:16 should contain the data item for slot 4.

When an output audio frame is to be constructed by the frame generator/decoder, then data items are removed from the FIFO buffer 200 one 20 bit word at a time. The frame generator/decoder 100 incorporates a parallel to serial shift converter, which is arranged to output the bits of the data item most significant bit first.

Returning now to the received part of the channel 110, when the data items are read from the serial to parallel shift converter into the FIFO, the data is provided most significant bit first, and a receive overrun interrupt is used if the FIFO is full, but the receive channel has received more data.

As mentioned previously, the data items are at a fixed length of 20 bits when transferred in the data slots of an audio frame, and these 20 bit data items are stored into the receive FIFO 210. The RSIZE bits in the receive control register 230 give an indication of the actual size of the data items stored in the receive buffer 210. The resizer 255 then uses the RSIZE bit information to least significant bit (LSB) justify the 20 bit data when it is read out of the FIFO for transmission to the microprocessor. If the RSIZE bit is set to indicate data items of 12, 16 or 18 bits, the resizer 255 will be arranged to shift right the 20 bit data from the FIFO by the desired amount to form the correct data size for the data item. For example, if RSIZE indicates that the data items are 12 bits in length, the 20 bit word from the FIFO will be shifted right by 8 bit positions. The resizer will then additionally stuff zeros into the most significant bits of the data word. In addition, the compact mode bit determines the size of the data word created by the resizer 255.

Additionally, it should be noted that the data items in the receive channel should be provided lowest slot number first. Hence, if for example the receive FIFO 210 is set up to store data items from data slots 3 and 4, then the first data item out of the FIFO will be relating to slot 3, followed by the data item relating to slot 4. If the RSIZE value is set to 12 or 16 bits, and the compact mode bit is set, then the data item pertaining to slot 3 is in preferred embodiments contained in the bits 15:0 of the data word to be transmitted to the microprocessor, and the data item for slot 4 is contained in bits 31:16 of that data word.

This process is performed by the receive packer 250 which determines based on the CM bit information and the RSIZE bit information whether it is possible to fit two data items into a data word to be passed to the microprocessor. In particular, if it is possible, a 32 bit word output by the controller is arranged to consist of two data items, the packer 250 joining two data words from the resizer 255 into a single 32 bit word. As mentioned earlier, when discussing the transmit part of the channel the compact mode will only operate if the RSIZE bits are set to either 12 or 16 bits. Further, if the compact mode is not set, then a 32-bit word output from the controller will only contain one data item, even if RSIZE is set to 12 or 16 bits. Again, if the compact mode is set, the user must ensure that the FIFO channels are set up to receive even numbers of data items, for example data items for slots 3 and 4, not data items for slots 3, 4 and 5.

It will be appreciated by those skilled in the art that the function of one or more of resizer 245, 255, packer 250 and/or unpacker 240 may be implemented externally to the channels, to enable one logical unit to handle these functions for all channels, controlled via the channels' control registers.

Figure 8:
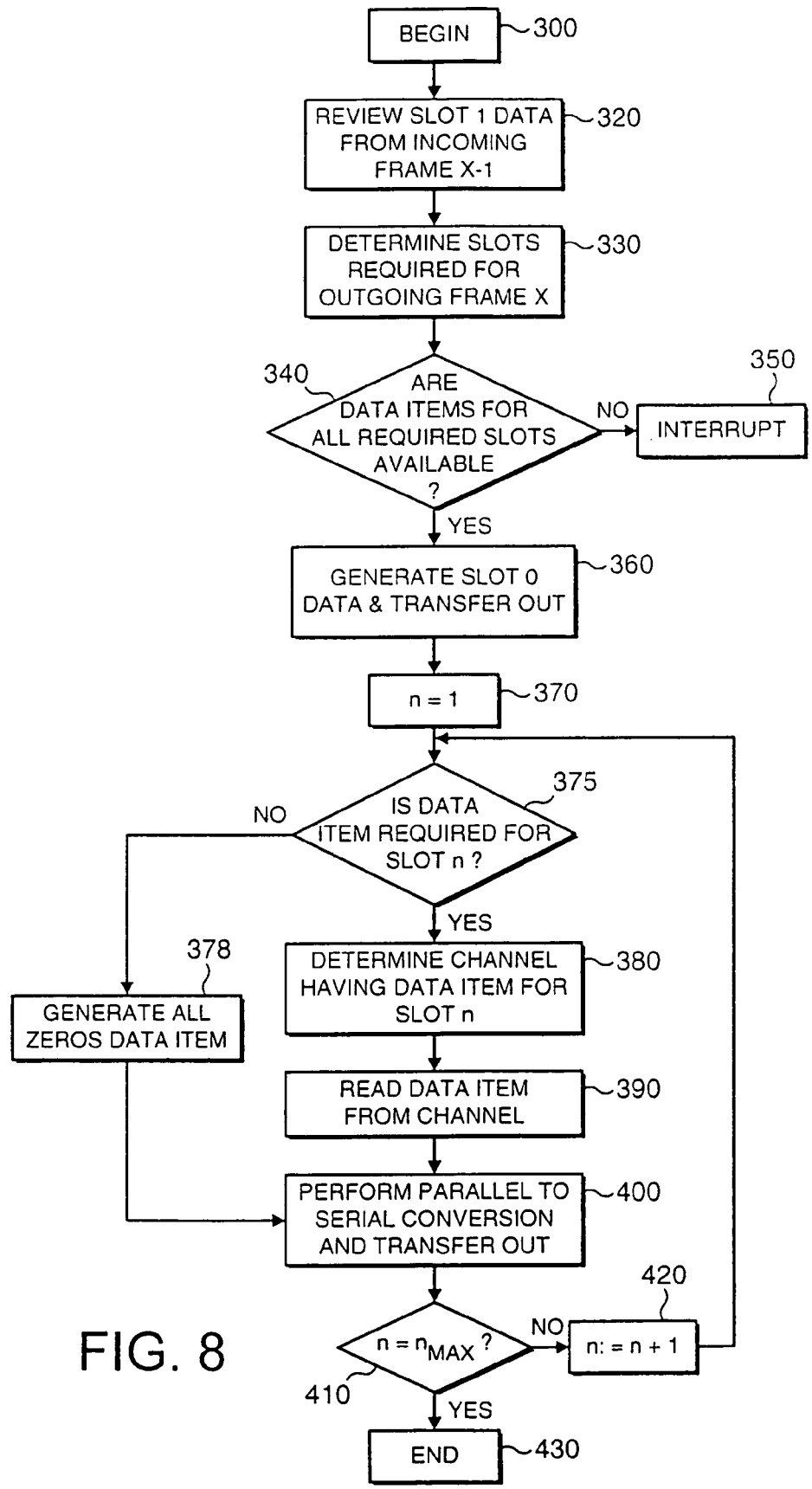
FIG. 8 is a flow diagram illustrating the process of generating an outgoing frame in accordance with preferred embodiments of the present invention.

The operation of the frame generator/decoder 100 in preferred embodiments of the present invention will now be described in more detail with reference to the flow diagrams of FIGS. 8 and 9. Looking first at FIG. 8, this illustrates the process performed by the frame generator/decoder 100 in order to generate an outgoing frame X. Starting at step 300, the process proceeds to step 320, where the Data Request disable bits from slot 1 of the previous incoming frame X-1 are reviewed. As mentioned previously, if the Data Request disable bits are not supported by the external codec, these bits will be set to zero, indicating that the standard sampling rate should be used for all data slots (and hence in preferred embodiments that data items for all data slots should in theory be output in the next frame (frame X)). However, if the Data Request disable bits are supported by the external codec, one or more of the bits may be set to 1 to indicate that data items for the corresponding data slot(s) should not be output in frame X.

Irrespective of whether the Data Request disable bits are supported or not, the controller can only output data items in data slots corresponding to data elements that the controller has been set up to store. Hence, as an example, if none of the transmit FIFOs of the controller have been set up to handle modem line 1 data, then the controller cannot output valid data in the corresponding data slot (data slot 5), irrespective of the value of the relevant Data Request disable bit. Accordingly, in addition to reviewing the Data Request disable bits at step 320, the process proceeds to step 330, where the control data in the transmit control registers is referenced. Based on that control data, and the value of the Data Request disable bits, the frame generator 100 determines for which data slots data items are required for outgoing frame X. Hence, in preferred embodiments, a data slot will be required if the relevant Data Request disable bit is set to zero, and the control data indicates that one of the transmit FIFOs has been set up to handle data items for that data slot.

The process then proceeds to step 340, where it is determined whether data items for all required slots are available. As mentioned previously, in preferred embodiments, the controller aims to ensure that there will always be sufficient data items in the data buffers, and accordingly it is expected that the data items for all required slots will be available, and the process will proceed to step 360. However, in the event that certain data items are not available, the process will branch to step 350, where an interrupt is invoked. It will be appreciated that the interrupt may be handled in a number of different ways. For example, the interrupt may be used to cause the required data items to be retrieved from the memory to the relevant data buffer, with the process then being resumed. A further discussion of how the controller manages the receive and transmit FIFOs with the aim of ensuring that sufficient data items are always present in those FIFOs will be discussed in more detail later with reference to FIGS. 10 and 11.

Assuming the process branches from step 340 to step 360, the frame generator 100 is then arranged to generate slot 0 data and transfer that data out. As mentioned previously, the slot 0 data is generated on the basis of the validity of the data items in the relevant data buffers of the controller, the values in the transmit control registers, and, assuming variable rate is enabled, the value of Disable Request bits from the incoming slot 1 of frame X-1. Prior to the slot 0 data being transferred out, a parallel to serial converter will be used to convert the bits of slot 0 into a serial data stream for outputting on to the AC-link.

Once the data has been transferred out for transmission on the AC-link, at step 370 a variable "n" is set equal to 1, and the process then proceeds to step 375, where it is determined whether a data item is required for slot n. This determination is made by the controller with reference to the information determined earlier at step 330. If a data item is not required for this slot, then the controller is arranged to generate an all zeros data item at step 378. The process then proceeds to step 400, where the parallel to serial conversion takes place, and the data is then transferred out for transmission in the appropriate slot of the data frame transmitted on the AC-link.

Assuming at step 375 it is determined that a data item is required for slot n, then the process proceeds to step 380, where it is determined which channel has the data item for slot "n". To determine this, the frame generator 100 will review the data in the transmit control registers associated with the transmit FIFOs, those control registers including control data identifying for which data element(s), and hence for which data slots(s), the corresponding transmit FIFO stores data items. Once this determination has been made, the frame generator 100 is then arranged to read a data item from the transmit FIFO of the relevant channel (step 390), after which the process proceeds to step 400, where the parallel to serial conversion takes place, and the data is then transferred out for transmission in the appropriate slot of the data frame transmitted on the AC-link.

At step 410, it is then determined whether n equals $n_{MAX}$, $n_{MAX}$ being the number of data slots in each frame, discounting slot 0. If n does equal $n_{MAX}$, then the process proceeds to step 430, where the process ends. Otherwise, the process proceeds to step 420, where n is incremented by 1, and the process then returns to step 375 in order to generate the data item for the next data slot.

Figure 9:
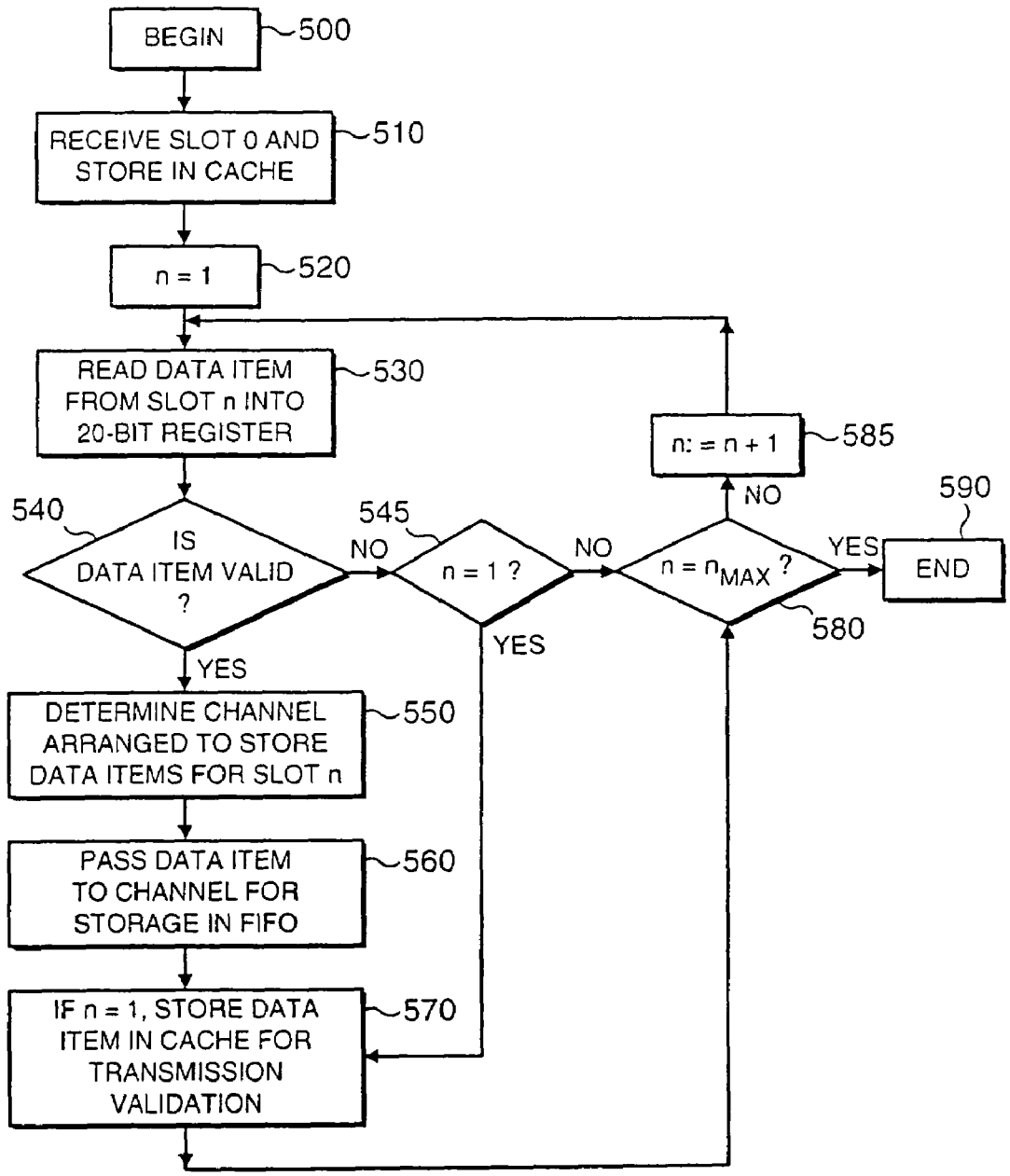
FIG. 9 is a flow diagram illustrating the process of decoding an incoming frame in accordance with preferred embodiments of the present invention.

FIG. 9 is a flow diagram illustrating the process performed in preferred embodiments when decoding an incoming frame of data received from the AC-link. The process begins at step 500, and then proceeds to step 510, where slot 0 is received and stored in a cache. This process will involve the slot 0 data passing through a serial to parallel converter to generate the data item to be stored into the cache. This data is stored in the cache, as it indicates the validity of the data in the remaining slots of the incoming data frame, and hence needs to be referenced by the frame decoder 100 when decoding the incoming frame.

Then, at step 520, a variable "n" is set equal to 1, after which the process proceeds to step 530, where the data item from slot n is read into a 20-bit register. Again, this process involves serial to parallel conversion of the serial data received from the AC-link in order to generate a 20-bit data item to be stored in the register.

The process then proceeds to step 540, where it is determined whether that data item is valid, this process involving the frame decoder 100 reviewing the slot 0 data stored in the cache at step 510 for an indication as to whether the data item is valid. If the data item is not valid, the process proceeds to step 545, where it is determined whether n equals 1. If so, the process proceeds to step 570, which will be discussed later. However, assuming n does not equal 1, the process proceeds to step 580, where it is determined whether n is equal to $n_{MAX}$, i.e. whether the last data slot in the frame has been received. If it has, then the process branches to step 590, where the process ends. Otherwise, the process proceeds to step 585, where n is incremented by 1, the process then returning to step 530 to read the data item from the next slot in the incoming frame.

If at step 540, it is determined that the data item for the current data slot is valid, then at step 550 it is determined which channel is arranged to store data items for slot n. The frame decoder 100 performs this determination by referencing the receive control registers associated with the receive FIFOs in each channel, these receive control registers including control data identifying for which data element(s), and hence for which data slot(s), the corresponding receive FIFO is arranged to store data items.

Once the appropriate channel has been identified, the data item is then passed from the 20-bit register into the receive FIFO of the relevant channel at step 560. In addition, at step 570, if n equals 1, the data item is also stored in a cache for use subsequently by the frame generator/decoder 100 in performing transmission validation for the subsequent outgoing frame. This process has already been discussed earlier with reference to FIG. 8.

The process then loops back to step 580, where it is determined whether n equals $n_{MAX}$. If it does, the process ends, whilst if it doesn't, n is incremented by 1, and the process returns to step 530.

Having discussed how the frame generator/decoder 100 is arranged to generate outgoing frames, and decode incoming frames, a process that may be used within the controller to manage the contents of the receive and transmit FIFOs of a particular channel will now be discussed in more detail with reference to FIGS. 10 and 11. Dealing first with FIG. 10, this is a flow diagram illustrating how the controller manages the contents of a receive FIFO. In preferred embodiments, this process is performed independently for each receive FIFO. Firstly, at step 600 it is determined from the associated receive control register the number of data elements (referred to as the variable Z) whose data items are storable in the receive FIFO. Hence, if the control data in the control register indicates that the corresponding FIFO stores data items for slots 3 and 4, then in this case Z will be equal to 2.

Then, at step 610, a variable "MAXNUMBER" is determined for the FIFO dependent on Z. It will be appreciated that there are a number of algorithms that may be used to determine a suitable value of MAXNUMBER. For example, if the FIFO can store six entries, and Z equals 2, then it would be appropriate for MAXNUMBER to be equal to either 2 or 4. IF MAXNUMBER were set to be equal to 6, then this would in effect mean that the FIFO could be completely full, before any action is taken to remove data items from the receive FIFO to memory. Clearly, this would be disadvantageous, since it would prevent any new data items received in a subsequent incoming frame from being stored into the receive FIFO.

Once MAXNUMBER has been determined, the process proceeds to step 620, where it is determined whether the number of data items in the FIFO is greater than or equal to MAXNUMBER. If not, then the process loops back to step 620, whilst if the number of data items is greater than or equal to MAXNUMBER, the process proceeds to step 630. At step 630, a request is sent by the controller to the microprocessor, in order to cause the microprocessor to read a predetermined number (hereafter referred to as "PZ") of data items from the FIFO, where P is an integer. This will ensure that whenever data items are read from the FIFO to memory, they are read out in integral numbers of the number of data elements whose data items are managed by that FIFO. For example, if the receive FIFO is arranged to store data items for three data elements, for example data slots 3, 4 and 5, then the microprocessor will be arranged to only read data items out of the receive FIFO in multiples of 3.

Once the process step 630 has been performed, the process will then return to step 620. In preferred embodiments, the step 620 is repeated each clock cycle.

Figure 10:
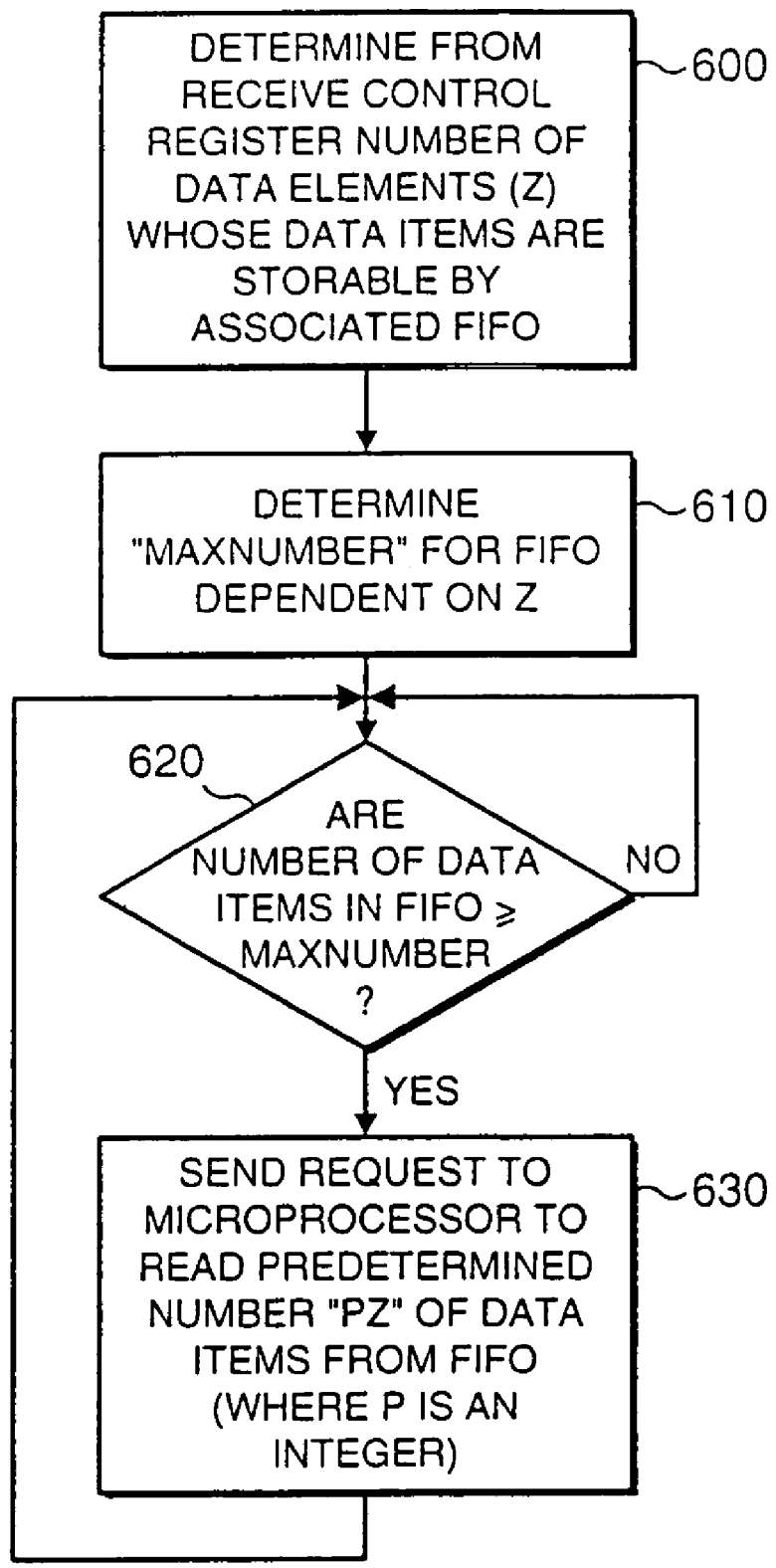
FIGS. 10 and 11 are flow diagrams illustrating the process used in preferred embodiments of the present invention to manage receive data buffers, and transmit data buffers, respectively.
Figure 11:
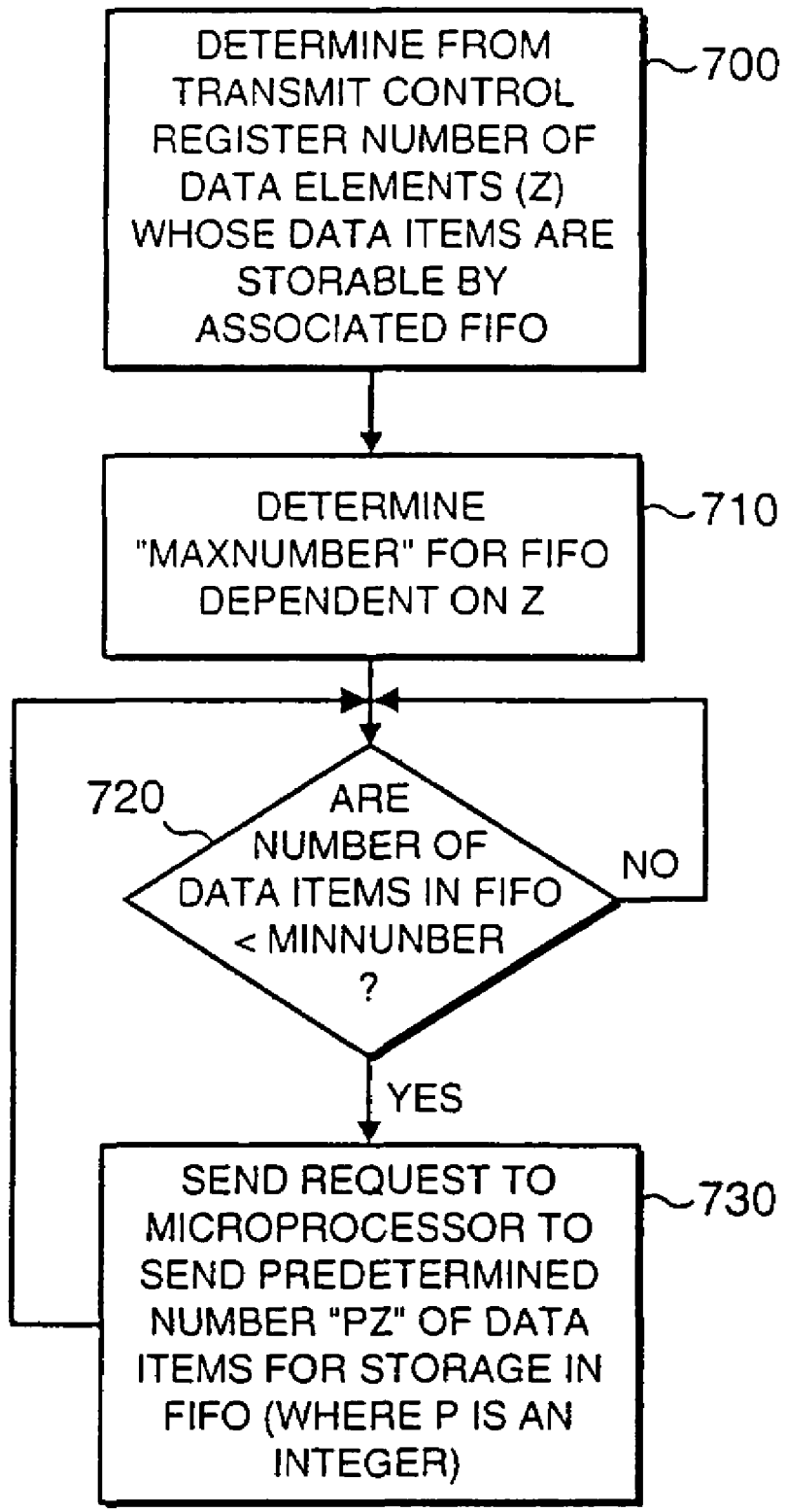

Turning now to the management of a transmit FIFO, this process is illustrated in more detail in FIG. 11. In preferred embodiments, this process is performed independently for each transmit FIFO. At step 700, the controller is arranged to determine from the transmit control register of a particular transmit FIFO the number of data elements Z whose data items are storable by that FIFO. This is an analogous process to step 600 illustrated in FIG. 10.

Then, the process proceeds to step 710, where a variable "MINNUMBER" is determined for the transmit FIFO dependent on the value of Z. Again, it will be appreciated by those skilled in the art that a number of different algorithms may be used to determine a suitable value of MINNUMBER. In preferred embodiments, MINNUMBER is chosen in any event to be no less than Z, since when data items are to be read out of the transmit FIFO for transmission in data slots of a data frame, Z data items will be read out for a particular frame, and accordingly a minimum of Z data items should remain in the transmit FIFO.

Once the variable MINNUMBER has been determined, the process proceeds to step 720, where it is determined whether the number of data items in the transmit FIFO is less than or equal to MINNUMBER. Assuming not, then the process returns to step 720, whilst if the number of data items is less than or equal to MINNUMBER, the process proceeds to step 730.

At step 730, the controller sends a request to the microprocessor to send a predetermined number "PZ" of data items for storage in the transmit FIFO, where P is an integer. Hence, this ensures that the microprocessor sends an appropriate number of data items to the FIFO for storage. For example, if the FIFO is arranged to store data items for data slots 3, 4 and 5, this will ensure that the microprocessor sends a number of data items which is a multiple of 3, and hence for example may be arranged to send 3 data items, one for slot 3, one for slot 4 and one for slot 5.

Once the process at step 730 has been performed, the process returns to step 720, where it is again determined whether the number of data items in the FIFO is less than or equal to MINNUMBER. In preferred embodiments, the step 720 is repeated every clock cycle.

It will be appreciated by those skilled in the art that the processes illustrated in FIGS. 10 and 11 may be altered whilst still enabling effective management of the transmit and receive FIFOs. For example, a simplified approach would be to remove the dependence of MAXNUMBER and MINNUMBER on the number of data elements Z, since Z will vary depending on the control data set in each control register. Instead, these values could be set dependent on the total number of entries in the FIFO, which is fixed. Accordingly, as an example, for a FIFO having eight entries, and hence capable of storing eight data items, MAXNUMBER and MINNUMBER could be set to four (i.e. half the FIFO size). This in effect removes the need for steps 600 and 610 in FIG. 10 and steps 700 and 710 in FIG. 11. However, with reference to steps 630 and 730, it is still preferable that a predetermined number PZ of data items are transferred between the FIFO and memory in any one transfer sequence.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A controller for controlling interfacing to a data link, the data link enabling data items relating to a number of data elements to be transferred in corresponding data slots of the data link, the controller comprising:

at least two channels, each channel comprising a data buffer for storing data items, and a control register associated with the data buffer and arranged to store control data, the control data settable to identify at least one data element whose corresponding data items are to be stored in the data buffer; and an interface mechanism for controlling the transfer of data items between the at least two channels and the data slots of the data link in dependence upon said control data, wherein the data buffer of each channel is arranged to store data items relating to one or more data elements having the same sampling rate, where data items relating to data elements having different sampling rates are stored to respective data buffers of different channels.

2. A controller as claimed in claim 1, wherein the data buffer of at least one of the at least two channels is arranged to store prior to transmission on the data link data items relating to at least one data element specified by the control data, and the interface mechanism is arranged to be responsive to the control data to transmit on the data link in the corresponding at least one data slot, data items retrieved from the data buffer.

3. A controller as claimed in claim 1, wherein the data buffer of at least one of the at least two channels is arranged to store data items received from the data link and relating to at least one data element as specified by the control data, and the interface mechanism is arranged to be responsive to the control data to store, in the data buffer, data items received from the corresponding at least one data slot.

4. A controller as claimed in claim 1, wherein each channel comprises a pair of said data buffers and their associated control registers, one of said data buffers arranged to store data items to be transmitted on the data link, and the other of said data buffers arranged to store data items received from the data link.

5. A controller as claimed in claim 1, wherein the controller is connectable to a codec via the data link.

6. A controller as claimed in claim 1, wherein each data buffer comprises a first-in-first-out (FIFO) buffer.

7. A controller as claimed in claim 1, further comprising a memory interface for coupling the controller to a memory, to enable data items to be transferred between the memory and the at least one channel.

8. A controller as claimed in claim 7, wherein the memory interface couples the controller to the memory via a processor arranged to control access to the memory.

9. A controller for controlling interfacing to a data link, the data link enabling data items relating to a number of data elements to be transferred in corresponding data slots of the data link, the controller comprising:
at least one channel, each channel comprising a data buffer for storing data items, and a control register associated with the data buffer and arranged to store control data, the control data settable to identify at least one data element whose corresponding data items are to be stored in the data buffer;
an interface mechanism for controlling the transfer of data items between the at least one channel and the data slots of the data link in dependence upon said control data; and
a memory interface for coupling the controller to a memory, to enable data items to be transferred between the memory and the at least one channel, wherein each control register has a first field settable to indicate a compact mode in which data words passed between the associated data buffer and the memory comprise a plurality of said data items.

10. A controller as claimed in claim 9, wherein data items are represented as a fixed size when transferred in the data slots, and each control register has a second field settable to indicate the actual size of data items stored in the associated data buffer, and if the first field is set the memory interface is arranged to reference the second field in order to determine how many data items are to be included in each data word passed between the associated data buffer and the memory.

11. A controller as claimed in claim 9, wherein data items are represented as a fixed size when transferred in the data slots, and each control register has a second field settable to indicate the actual size of data items stored in the associated data buffer, and if the first field is set the memory interface is arranged to reference the second field in order to determine how many data items are to be included in each data word passed between the associated data buffer and the memory.

12. A controller for controlling interfacing to a data link, the data link enabling data items relating to a number of data elements to be transferred in corresponding data slots of the data link, the controller comprising:
at least one channel, each channel comprising a data buffer for storing data items, and a control register associated with the data buffer and arranged to store control data, the control data settable to identify at least one data element whose corresponding data items are to be stored in the data buffer;
an interface mechanism for controlling the transfer of data items between the at least one channel and the data slots of the data link in dependence upon said control data; and
a memory interface for coupling the controller to a memory, to enable data items to be transferred between the memory and the at least one channel, wherein data items are represented as a fixed size when transferred in the data slots, and each control register has a field settable to indicate the actual size of each data item stored in the associated data buffer, thereby enabling the memory interface to convert the data items between the actual size and the fixed size.

13. A controller for controlling interfacing to a data link, the data link enabling data items relating to a number of data elements to be transferred in corresponding data slots of the data link, the controller comprising:
at least one channel, each channel comprising a data buffer for storing data items, and a control register associated with the data buffer and arranged to store control data, the control data settable to identify at least one data element whose corresponding data items are to be stored in the data buffer;
an interface mechanism for controlling the transfer of data items between the at least one channel and the data slots of the data link in dependence upon said control data; and
a memory interface for coupling the controller to a memory, to enable data items to be transferred between the memory and the at least one channel, wherein the control data within the control register specifies the number of data elements whose data items are stored in the associated data buffer, and the memory interface is arranged to control the rate of transfer of data between the data buffer and the memory dependent on the control data.

14. A controller for controlling interfacing to a data link, the data link enabling data items relating to a number of data elements to be transferred in corresponding data slots of the data link, the controller comprising:
at least one channel, each channel comprising a data buffer for storing data items, and a control register associated with the data buffer and arranged to store control data, the control data settable to identify at least one data element whose corresponding data items are to be stored in the data buffer;
an interface mechanism for controlling the transfer of data items between the at least one channel and the data slots of the data link in dependence upon said control data, wherein the number of channels provided by the controller is less than the number of data elements whose data items are capable of being transferred by the data link; and
comprising a memory interface for coupling the controller to a memory, to enable data items to be transferred between the memory and the at least one channel, wherein each control register has a first field settable to indicate a compact mode in which data words passed between the associated data buffer and the memory comprise a plurality of said data items.

15. A controller for controlling interfacing to a data link, the data link enabling data items relating to a number of data elements to be transferred in corresponding data slots of the data link, the controller comprising:

at least one channel, each channel comprising a data buffer for storing data items, and a control register associated with the data buffer and arranged to store control data, the control data settable to identify at least one data element whose corresponding data items are to be stored in the data buffer;

an interface mechanism for controlling the transfer of data items between the at least one channel and the data slots of the data link in dependence upon said control data, wherein the number of channels provided by the controller is less than the number of data elements whose data items are capable of being transferred by the data link; and comprising a memory interface for coupling the controller to a memory, to enable data items to be transferred between the memory and the at least one channel, wherein data items are represented as a fixed size when transferred in the data slots, and each control register has a field settable to indicate the actual size of each data item stored in the associated data buffer, thereby enabling the memory interface to convert the data items between the actual size and the fixed size.

16. A controller for controlling interfacing to a data link, the data link enabling data items relating to a number of data elements to be transferred in corresponding data slots of the data link, the controller comprising:

at least one channel, each channel comprising a data buffer for storing data items, and a control register associated with the data buffer and arranged to store control data, the control data settable to identify at least one data element whose corresponding data items are to be stored in the data buffer;

an interface mechanism for controlling the transfer of data items between the at least one channel and the data slots of the data link in dependence upon said control data, wherein the number of channels provided by the controller is less than the number of data elements whose data items are capable of being transferred by the data link; and comprising a memory interface for coupling the controller to a memory, to enable data items to be transferred between the memory and the at least one channel, wherein the control data within the control register specifies the number of data elements whose data items are stored in the associated data buffer, and the memory interface is arranged to control the rate of transfer of data between the data buffer and the memory dependent on the control data.

* * * * *